(12) United States Patent
Mueller-Marc et al.

(10) Patent No.: US 8,564,873 B2
(45) Date of Patent: Oct. 22, 2013

(54) DISPLAY DEVICE HAVING MULTI-COLOURED DISPLAY ELEMENTS

(75) Inventors: Oliver Mueller-Marc, Appenzell (CH);
Dieter Jerosch, Bad Soden (DE);
Andriy Bitman, Dortmund (DE); Frank Bartels, Hattingen (DE)

(73) Assignee: Advanced Display Technology AG, Appenzell (CH)

( * ) Notice: Subject to any disclaimer, the term of this patent is extended or adjusted under 35 U.S.C. 154(b) by 0 days.

(21) Appl. No.: 13/261,446

(22) PCT Filed: Mar. 21, 2011

(86) PCT No.: PCT/DE2011/000289
§ 371 (c)(1),
(2), (4) Date: Dec. 10, 2012

(87) PCT Pub. No.: WO2011/120494
PCT Pub. Date: Oct. 6, 2011

(65) Prior Publication Data
US 2013/0077152 A1    Mar. 28, 2013

(30) Foreign Application Priority Data
Mar. 27, 2010   (DE) .......................... 10 2010 013 152

(51) Int. Cl.
*G02B 26/00* (2006.01)
*G09G 3/34* (2006.01)
*G02F 1/133* (2006.01)
*H01B 1/00* (2006.01)

(52) U.S. Cl.
USPC ............. 359/296; 359/237; 345/107; 349/33; 252/500

(58) Field of Classification Search
USPC ......... 359/290, 295, 296, 245, 253–254, 265, 359/291, 292, 293, 315–318, 276, 238, 242, 359/259, 244, 198, 260–263, 223–225, 359/301–303, 237; 345/30, 48, 50, 60, 84, 345/32, 41, 105–107, 204, 34; 349/33; 252/500, 586

See application file for complete search history.

(56) References Cited

U.S. PATENT DOCUMENTS 5,731,792 A    3/1998  Sheridon
5,956,005 A *  9/1999  Sheridon ......................... 345/84

(Continued)

FOREIGN PATENT DOCUMENTS

DE          697 11 750 T2      9/2002
DE      10 2005 008 834 A1    8/2006

(Continued)

*Primary Examiner* — Dawayne A Pinkney
(74) *Attorney, Agent, or Firm* — Marshall & Melhorn, LLC

(57) ABSTRACT

The invention relates to a display apparatus having at least one electronically controllable display element that comprises: at least one nonpolar and at least two electrically conductive or polar liquids; a fluidically sealed volume having a visible sub-volume and at least two holding volumes connected fluidically to the visible sub-volume; and at least one voltage source that is applied to a first electrode arrangement; the visible sub-volume being of planar embodiment so that when the first electrode arrangement is in the zero-voltage state, the electrically conductive or polar liquids are drawn into the respective holding volume; and the display element furthermore comprising mechanical and/or electrical means for selectably retaining in their holding volumes those electrically conductive or polar liquids which are not intended to be moved into the visible sub-volume by an impingement of voltage on the first electrode arrangement.

12 Claims, 4 Drawing Sheets

(56) References Cited

U.S. PATENT DOCUMENTS

| | | |
|---|---|---|
| 7,586,472 B2 | 9/2009 | Marcu et al. |
| 7,834,845 B2 | 11/2010 | Sacher |
| 8,111,465 B2 | 2/2012 | Heikenfeld et al. |
| 8,203,512 B2 | 6/2012 | Marcu et al. |
| 2003/0103021 A1 | 6/2003 | Young et al. |
| 2010/0208328 A1* | 8/2010 | Heikenfeld et al. .......... 359/290 |
| 2011/0007056 A1* | 1/2011 | Huitema ....................... 345/211 |
| 2012/0092748 A1* | 4/2012 | Ostergaard et al. .......... 359/290 |

FOREIGN PATENT DOCUMENTS

| | | |
|---|---|---|
| EP | 0 783 122 A2 | 7/1997 |
| EP | 0 806 753 A1 | 11/1997 |
| WO | WO 2009/036272 A1 | 3/2009 |

* cited by examiner

DISPLAY DEVICE HAVING MULTI-COLOURED DISPLAY ELEMENTS

BACKGROUND OF THE INVENTION

The invention relates to a display apparatus having at least one electronically controllable display element. More specifically, the invention relates to a display apparatus that makes use of the electrowetting effect.

It is known to implement display apparatuses with the aid of colored liquids, for which purpose the liquids can be shifted between positions visible and not visible to an observer. An efficient means for shifting the liquids is so-called electrowetting, in which an electrode arrangement present in the immediate vicinity of the liquid droplet is impinged upon by a voltage, with the result that an electric field acts on the liquid droplet, the consequence of which is that the surface energy and thus the surface tension of the liquid rises. Depending on the arrangement, this can cause the liquid to spread out on the electrode or in fact to cover it completely, depending on the geometry and/or surface condition exhibited by the electrode, and on the relative positions also assumed by the liquid and the electrode with respect to the earth's gravitational field. It is known to equip the electrodes with a hydrophobic coating in order thereby to achieve a maximum effect between the state of the liquid with the electrode impinged upon and not impinged upon. With the aforesaid means it is already possible to implement droplet motion with no need to resort to further functional elements.

The local surface energy of the liquid can thus be modified, and the geometry of a droplet thereby locally changed, by means of a local variation of the electric field strength. In particular, the generation of a locally elevated surface energy can cause a movement of the droplet, by the fact that the latter expands preferentially into the corresponding region characterized by the presence of an electric field. Conversely, the surface voltage causes liquid to be is pulled back, by the influenced part of the droplet, out of the region in which it is uninfluenced and thus exhibits a lower surface energy, since in this region it "seeks" the lowest-energy geometry, namely that of a sphere. The result is a net transport of liquid out of the region of lower field strength into the region of higher field strength.

A variety of displays have already been implemented on this basis. The goal in this context was usually always to produce an electronically controllable bistable display element that selectably assumes one or the other state. It is thus known, for example, to transport a liquid with the aid of the electrowetting effect back and forth between a first and a second volume that are connected to one another via a conduit, for which purpose each volume comprises an assigned electrode so that the transport direction results in each case from the field-strength relationship between the two electrodes. By preference, only those respective electrodes in whose direction the liquid is intended to be transported are impinged upon by a potential.

WO 2009/036272 A1 discloses an electrowetting-based display apparatus in which each display pixel has associated with it an electrode pair that constitutes a capacitor, with the aid of which a liquid that is present in a visible volume of the pixel can be impinged upon by an electric field. Return transport of the polar or electrically conductive liquid into a reservoir, which is located below the visible display surface in the viewing direction toward the display element, is achieved by the fact that the geometries of the visible display volume and those of the reservoir are coordinated with one another in such a way that the polar or electrically conductive liquid, when it is not impinged upon by an electric field, is drawn into the reservoir by Young-Laplace pressure.

If it were desired to implement a multi-color display with the aid of the technology recited above, this would be possible only with the aid of a plurality of pixels, arranged next to one another on the display surface, that comprise differently colored liquids. It is not possible, however, to operate the apparatus according to WO 2009/036272 A1 in such a way that a single pixel can assume more than two color states.

EP 0 806 753 describes a display apparatus having at least one electronically controllable display element, in which apparatus each display element has associated with it a separate electrode pair for controlling a liquid held in a holding volume. An embodiment is described in which the display element encompasses a visible sub-volume that is fluidically connected to three holding volumes.

SUMMARY OF THE INVENTION

The object of the invention is therefore to propose a display apparatus of the species in which at least one display element can assume more than two color states.

The object is achieved by a display apparatus according to the present invention that includes at least one electronically controllable display element that comprises:
  at least one nonpolar and at least two electrically conductive or polar liquids, at least the electrically conductive or polar liquids not being miscible with the nonpolar liquid, and the electrically conductive or polar liquids always being present physically separately from one another;
  a fluidically sealed volume having a visible sub-volume and at least two holding volumes, connected fluidically to the visible sub-volume, each for holding exactly one of the electrically conductive or polar liquids, in each of which at least a portion of the nonpolar liquid is located when the electrically conductive or polar liquid held in the respective holding volume is present in the visible sub-volume; and
  at least one voltage source that is applied to a first electrode arrangement and is designed to selectively permeate the visible sub-volume at least locally with an electric field,
the visible sub-volume being of planar embodiment, having dimensions which are selected in such a way that when the first electrode arrangement is in the zero-voltage state, the electrically conductive or polar liquids are drawn into the respective holding volume as a result of Young-Laplace pressure; and
the display element furthermore comprising mechanical and/or electrical means for selectably retaining in their holding volumes those electrically conductive or polar liquids which are not intended to be moved into the visible sub-volume by an impingement of voltage on the first electrode arrangement.

Proceeding from the existing art, one skilled in the art will recognize that the planar embodiment of the visible sub-volumes provided according to the present invention is to be understood in particular in such a way that the Young-Laplace pressure impingement, necessary for the functionality of the proposed display apparatus, on the electrically conductive or polar liquid component is guaranteed when the latter is present in the visible sub-volume and is not influenced by an electric field. In addition, one skilled in the art will know that when designing the planar visible sub-volume, and in particular its shortest dimension, with a view to making use of Young-Laplace pressure, he or she must also take into account the dimensioning of the respective second sub-volume and coordinate the two sub-volumes with one another.

The essential difference between the present invention and the existing art described is that it is now possible, with the aid of a single display element, to present more than two color states, in particular more than one colored and one colorless state. Because the electrically conductive or polar liquids, as used according to the existing art for conventional electrowetting display elements, are in principle miscible with one another, the present invention provides mechanical and/or electrical means for selectably retaining in their holding volumes those electrically conductive or polar liquids which are not intended to be moved into the visible sub-volume by a voltage impingement on the first electrode arrangement. These means not only suppress intermixing of the electrically conductive or polar liquids but furthermore, depending on the embodiment of the first electrode arrangement, are what in fact makes it possible at all, as a result of a voltage impingement thereon, to convey into the visible sub-volume only that electrically conductive or polar liquid which exhibits the color desired for the display function.

It is useful to embody the visible sub-volume in a first plane facing toward an observer, and the holding volume in a second plane subordinate to the first plane. Fluidic linkage of the holding volumes to the visible sub-volume preferably occurs in this context on an underside, facing away from the observer, of the visible sub-volume.

In order to avoid hydraulic blockage as a result of liquid shifts as a consequence of voltage impingement by the first electrode arrangement, it is useful to provide return flow conduits for returning at least part of the nonpolar liquid out of the visible sub-volume into that holding volume whose electrically conductive or polar liquid is intended to be moved into the visible sub-volume. This can be implemented, for example, in such a way that the visible sub-volume comprises on its underside a return flow conduit that extends along its periphery, with branches to the transition regions between the visible sub-volume and the holding volumes. In order to minimize the length of the branches, it is useful to connect the holding volumes in the region of the periphery of the visible sub-volume fluidically to the latter. It is thereby also possible to prevent inhomogeneous filling of the visible sub-volume, which might otherwise occur as a result of the return flow conduits extending through the visible sub-volume. The return flow conduits are preferably embodied as depressions, generating a capillary discontinuity.

It is possible in principle to embody the display apparatus according to the present invention in reflective or alternatively also transflective fashion, i.e. either using exclusively ambient light, or using an additional light source. An embodiment of the display apparatus that is embodied reflectively is notable for the fact that the nonpolar liquid should be substantially transparent, and the light reflected at an underside of the visible sub-volume thus assumes the color of a reflector when the nonpolar liquid is present in the visible sub-volume. In principle, the underside should represent specifically that side of the planar visible sub-volume at which the holding volumes are in fluidic communication with the visible sub-volume. It may be useful to arrange the reflector behind the visible sub-volume in the light incidence direction.

Alternatively, the display apparatus can also be embodied transflectively, i.e. with the aid of self-luminous display elements, having a light source of a specific color spectrum that is arranged below the visible sub-volume in the viewing direction toward the display apparatus, and emits optical light that propagates at least partly through the visible sub-volume anti-parallel to the viewing direction of an observer. Provision is thus made that the electrically conductive or polar liquids act as a color filter for the light of the light source.

In a further embodiment of the invention, the mechanical and/or electrical means encompass an electrically controllable valve or obstacle. Particularly preferably, the mechanical and/or electrical means are intended to encompass a second electrode arrangement. It may be useful in this context for the second electrode arrangement to encompass selection electrodes having a hydrophobic surface or coating, which are arranged in the transition region from each holding volume to the visible sub-volume and, in the zero-voltage state, are not wetted by the electrically conductive or polar liquids. When a selection electrode of this kind is impinged upon by a voltage, however, it becomes wetted by an electrically conductive or polar liquid as a result of the electrowetting effect, and the liquid can be transported into the visible sub-volume. This still requires, however, that the visible sub-volume be permeated by an electric field via the first electrode arrangement. In other words, in this embodiment the hydrophobic selection electrodes function as an electrowetting valve.

Advantageously, the selection electrodes also extend around the transition region inside the visible sub-volume, so as thereby to form, as a result of their hydrophobic properties, a barrier for that electrically conductive or polar liquid which is present at a given point in time inside the visible sub-volume in the vicinity of the transition to those holding volumes with which the electrically conductive or polar liquid present in the visible sub-volume is not associated. This also prevents intermixing of the activated electrically conductive or polar liquid with the electrically conductive or polar liquids that are present in the holding volumes.

In addition to the feature just mentioned, it is also possible to provide elevations inside the visible sub-volume and around the transition region, which constitute a barrier both for that electrically conductive or polar liquid which is located inside the visible sub-volume and for those liquids which are present in the holding volumes.

In another embodiment of the invention, provision is made that the selection electrodes are through-plated through the respective holding volume to the back side of the display element, so that the display elements of the display apparatus are contactable over their entire back sides with the aid of standardized circuit boards. Electrode through-platings of this kind are known to one skilled in the art as "micro-vias," and are very well understood. With the aid of this embodiment, known TFT panels can be used as access elements. If there is no requirement in this context that the overall structure which is generated be transparent, as is the case e.g. for systems operated entirely reflectively, it is even possible to use standardized FR4 circuit boards or the like as access elements. Since it is possible with multi-layer connector technologies of this kind to mount the necessary control elements of the display apparatus, such as driver chips, on the back side of the structure, individual sub-modules can be fitted together almost seamlessly to yield large surfaces.

In an embodiment of the invention, provision is made that it comprises exactly eight holding volumes, which are in fluidic communication with one common visible sub-volume, and of which each holding volume receives one of the colors cyan, magenta, yellow, black, red, green, blue, and white.

In an advantageous embodiment of the invention, at least one holding volume is embodied as a planar cavity. A "planar cavity" for purposes of the invention is notable for the fact that it delimits a volume that is substantially smaller in at least one Cartesian spatial direction than in at least one further Cartesian spatial direction. In one configuration of the aforesaid embodiment, the planar cavities are arranged parallel to one another. With this embodiment as well, the colored liquid associated with a cavity can be transported by means of the first electrode arrangement into the visible sub-volume, in which context selective control of a specific colored liquid occurs, in a manner already described, with the aid of the above-described means, for example a second electrode arrangement. The aforementioned embodiment is advantageous in that the contour of the electrically conductive or polar liquid droplet changes only insignificantly during transport between the visible sub-volume and the associated holding volume. The liquid droplet thus exhibits the behavior known from monochrome arrangements.

Particularly preferably, two dimensions of the cavity thus each correspond substantially to one dimension of the visible sub-volume, with the result that the electrically conductive or polar liquid associated with the cavity is transportable in substantially dimensionally stable fashion between the cavity and the visible sub-volume.

In a particular embodiment using holding volumes that are embodied as planar cavities, at least one cavity is aligned along an outer edge of the visible sub-volume. Preferably at least the region through which the cavity opens into the visible sub-volume is aligned along an outer edge of the visible sub-volume.

Further details of the invention are the subject matter of the description below of the Figures, in which:

DETAILED DESCRIPTION OF THE INVENTION

Figure 1:
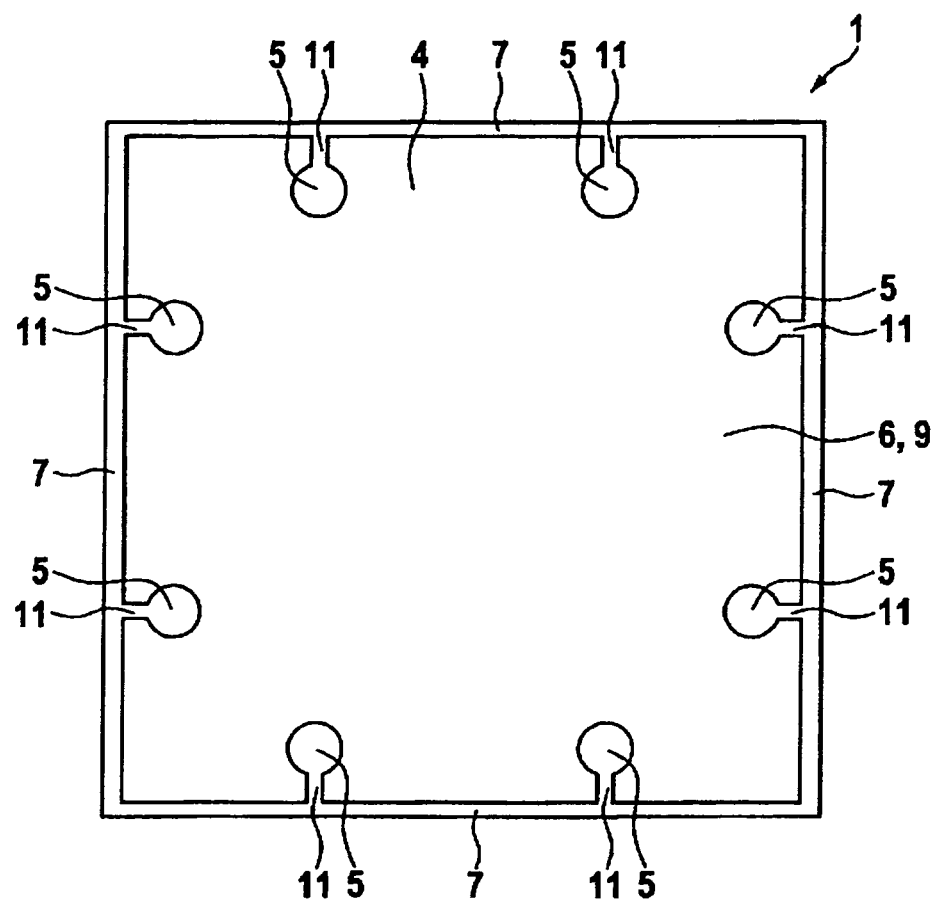
FIG. 1 is a plan view of a first embodiment of the display element according to the present invention.

FIG. 1 shows a first embodiment of a display element 1 according to the present invention, a plurality thereof that lie in one common plane preferably constituting the display apparatus according to the present invention. Display element 1 that is depicted comprises exactly eight holding volumes 5, each one of which receives, for example, one of the colors cyan, magenta, yellow, red, green, blue, black, and white in the form of an electrically conductive or polar liquid. As provided according to the present invention, visible sub-volume 4 can be seen in the plan view depicted; the area that can be seen in the two-dimensional depiction of FIG. 1 specifically depicts first electrode arrangement 6. It is possible to constitute first electrode arrangement 6 in the form of a single electrode, or with the aid of multiple electrodes. When separately controllable electrodes are used, it is useful to arrange these specifically in such a way that by selective control thereof, a specific electrically conductive or polar liquid that is located inside holding volumes 5 when electrode arrangement 6 is in the zero-voltage state can be moved, individually and independently of the other electrically conductive or polar liquids, into visible sub-volume 4. If first electrode arrangement 6 is in one piece, i.e. embodied with the aid of a single electrode that covers the entire surface 6, it is then necessary, for selective control of a single electrically conductive or polar liquid that is located in one of the holding volumes 5, that additional means be provided which, upon activation of the integral electrode 6, hold inside their holding volumes 5 those electrically conductive or polar liquids that are not intended to be moved into visible sub-volume 4.

It may furthermore be sensible in the context of the embodiment depicted to assign a reflector 9 to first electrode arrangement 6, or to embody electrode arrangement 6 itself as a reflector. The latter is already possible by the fact that first electrode arrangement 6 is embodied in the form of a reflective metal layer.

Also depicted is return flow conduit 7, necessary for preventing hydraulic blockage as a consequence of the liquid shifts, which possesses branches 11 that connect return flow conduit 7 fluidically to holding volumes 5. It is thus possible, as a consequence of a movement of the electrically conductive or polar liquid out of a holding volume 5 into visible sub-volume 2, to shift nonpolar liquid previously located in visible sub-volume 2, via return flow conduit 7 or corresponding branches 11, in particular into that holding volume 5 from which the electrically conductive or polar liquid to be presented in visible sub-volume 4 was held. If an electrically conductive or polar liquid is located inside visible sub-volume 4, and if the electrical voltage necessary therefor applied at first electrode arrangement 6 is interrupted, the consequence is then that the electrically conductive or polar liquid displaces the nonpolar liquid that is located in holding volume 5 associated with the electrically conductive or polar liquid out of said volume and into visible sub-volume 4.

Figure 2:
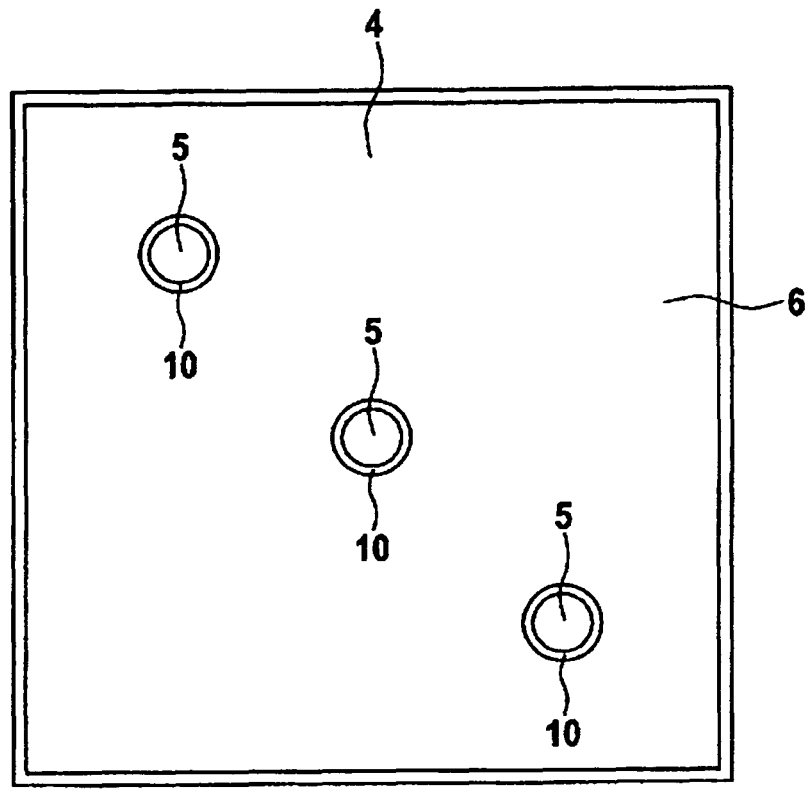
FIG. 2 is a plan view of a second embodiment of the display element according to the present invention.

FIG. 2 is a plan view of a second embodiment of display element 1 according to the present invention. In addition to visible sub-volume 4, which is made evident in the plan view in particular by the presence of first electrode arrangement 6, three holding volumes 5 are provided which comprise, in the transition region to visible sub-volume 4 or to first electrode arrangement 6 delimiting the visible sub-volume on one side, a selection electrode 10 electrically insulated from first electrode arrangement 6. Selection electrode 10 is preferably hydrophobically coated. This makes it possible to embody first electrode arrangement 6 integrally, i.e. in such a way that upon activation thereof, the entire visible sub-volume 4 is permeated with an electric field; the result of this would be in principle that each of the electrically conductive or polar liquids that are located in holding volumes 5 would attempt to penetrate into visible sub-volume 4. This can be suppressed, however, with the aid of that same selection electrode 10, specifically by the fact that only that electrically conductive or polar liquid whose associated selection electrode 10 is electrically impinged upon simultaneously with first electrode arrangement 6 is enabled to wet the associated hydrophobically coated selection electrode 10. The hydrophobic coating of the remaining selection electrodes 10, which are not activated, prevents wetting of the corresponding electrically conductive or polar liquids, and thus penetration thereof into visible sub-volume 4.

Figure 3:
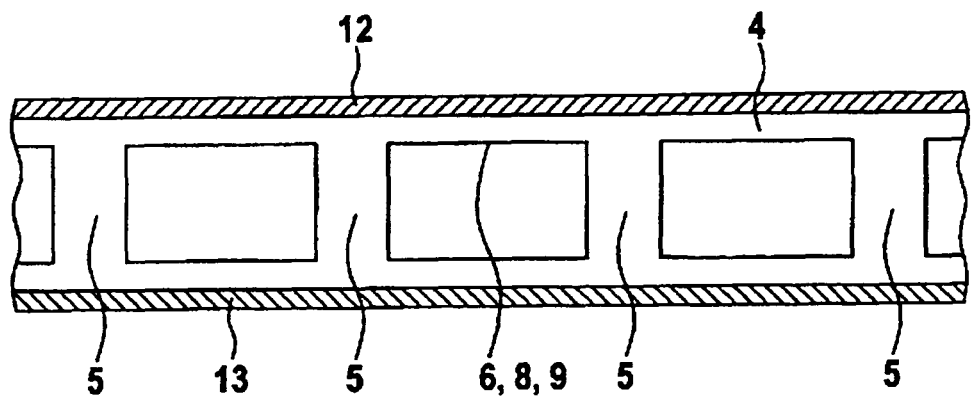
FIG. 3 is a cross-sectional view of a display element according to the present invention.

FIG. 3 is a cross-sectional view of one possible embodiment of display element 1 according to the present invention. In addition to a cover layer 12, a substrate layer 13 is also depicted. It is understood that cover layer 12 is preferably embodied to be transparent or partly transparent. Substrate layer 13 can also have an additional function associated with it. For example, it is possible to embody it as a contrast layer, for example white or black. It is evident from the cross-sectional view that the geometries of holding volumes 5, which are in fluidic communication with the common visible sub-volume 4 on the latter's underside 8, are coordinated with the planar geometry of visible sub-volume 4 in such a way that a liquid droplet that is moved into visible sub-volume 4 as a consequence of a voltage impingement on first electrode arrangement 6 is pulled back, after deactivation of first electrode arrangement 6, into a pertinent holding volume 5 as a result of Young-Laplace pressure. It is likewise evident that a reflector 9 is provided in addition to first electrode arrangement 6, the two being arranged in the region of underside 8 of visible sub-volume 4. It is apparent that this side 8 occupies specifically that surface in which holding volumes 5 come into fluidic communication with visible sub-volume 4.

Figure 4A:
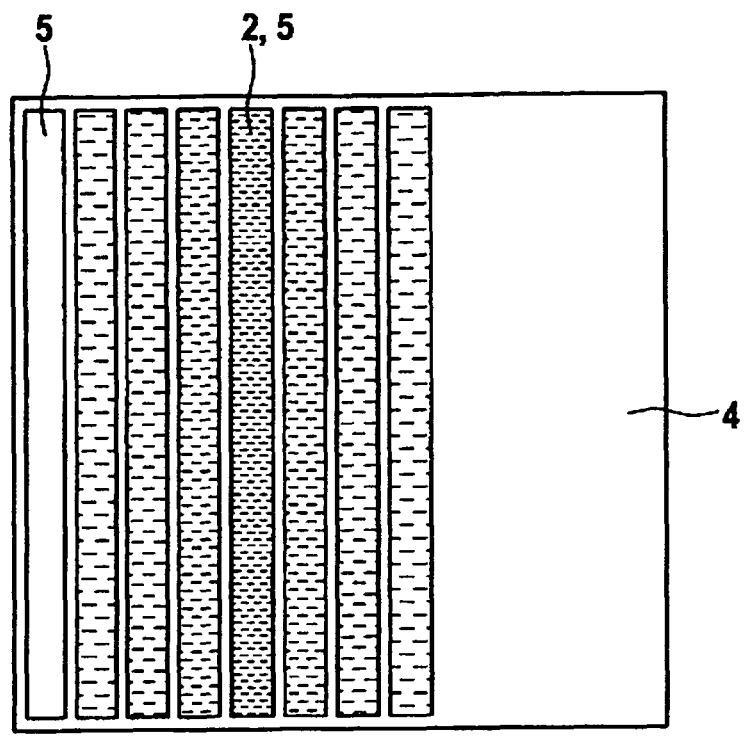
FIGS. 4a and 4b are a plan view and a side view of an embodiment having holding volumes embodied as planar cavities.
Figure 4B:
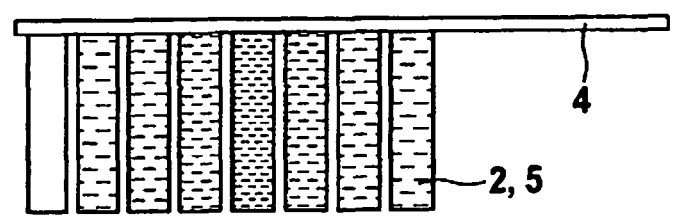

FIG. 4a is a plan view, and FIG. 4b a side view, of an embodiment having holding volumes 5 embodied as a planar cavity. It is evident from the plan view that the cavities have a dimension that corresponds substantially to the edge length of visible sub-volume 4. Electrically conductive or polar liquids 2 are held in all cavities 5 except one. Because cavity 5 and visible sub-volume 4 have a common edge length, a liquid 2 held in the cavity can be transported in substantially dimensionally stable fashion between cavity 5 and visible sub-volume 4.

Figure 5A:
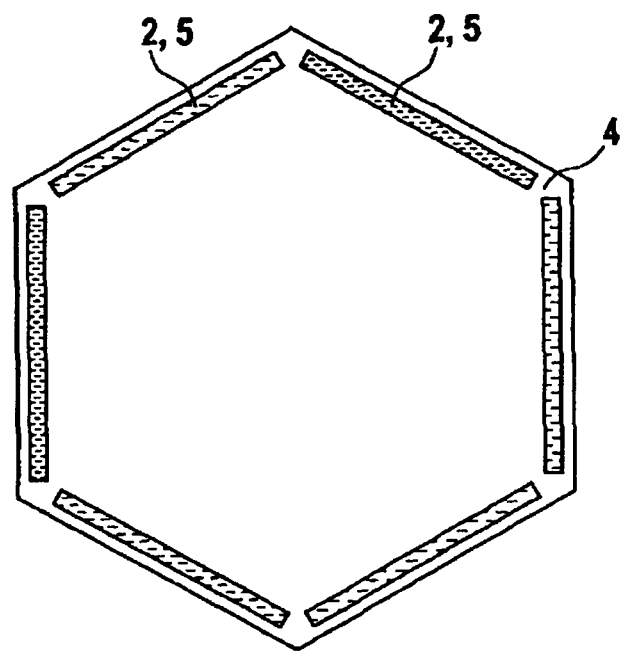
FIGS. 5a and 5b are a plan view and a side view of a further embodiment having holding volumes embodied as planar cavities.
Figure 5B:
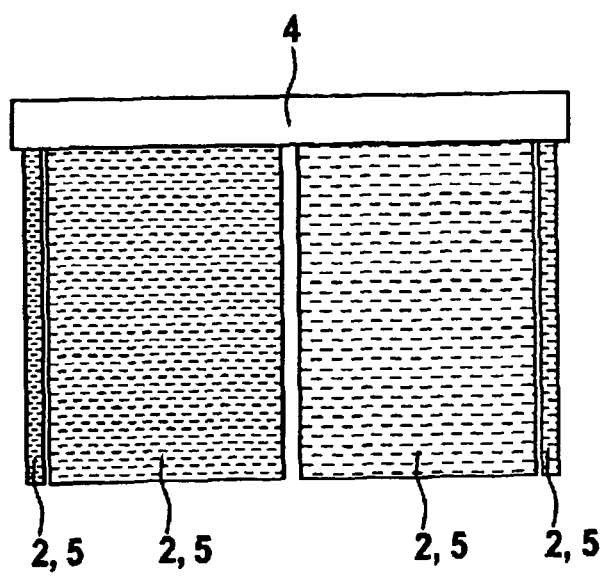

FIGS. 5a and 5b show an embodiment of the invention in which holding volumes 5, embodied as cavities, are aligned along an outer edge of visible sub-volume 4. In particular, for each cavity, as may be gathered in particular from the plan view 5a, the region through which cavity 5 opens into visible sub-volume 4 is also aligned along an outer edge of visible sub-volume 4. Differently colored electrically conductive or polar liquids 2 are once again depicted; these are selectively controlled with the aid of means described with reference to the preceding Figures and can be transported into visible sub-volume 4.

The features of the invention disclosed in the description above, in the drawings, and in the claims can be essential to implementation of the invention both individually and in any combination.

The invention claimed is:

1. A display apparatus having at least one electronically controllable display element that comprises:
   at least one nonpolar and at least two differently colored electrically conductive or polar liquids, at least the electrically conductive or polar liquids not being miscible with the nonpolar liquid, and the electrically conductive or polar liquids always being present physically separately from one another;
   a fluidically sealed volume having a visible sub-volume and at least two holding volumes, connected fluidically to the visible sub-volume, each for holding exactly one of the electrically conductive or polar liquids, in each of which at least a portion of the nonpolar liquid is located when the electrically conductive or polar liquid held in the respective holding volume is present in the visible sub-volume; and
   at least one voltage source that is applied to a first electrode arrangement comprising an electrode that is made in one piece and that covers the entire surface of the visible sub-volume, so that selectively the entire visible sub-volume may be permeated with an electric field,
   wherein the visible sub-volume being of planar embodiment, having dimensions which are selected in such a way that when the first electrode arrangement is in the zero-voltage state, the electrically conductive or polar liquids are drawn into the respective holding volume as a result of Young-Laplace pressure; and
   the display element furthermore comprising a second electrode arrangement for selectably retaining in their holding volumes those electrically conductive or polar liquids which are not intended to be moved into the visible sub-volume by an impingement of voltage on the first electrode arrangement, the second electrode arrangement including selection electrodes having a hydrophobic surface, which are arranged in the transition region from a holding volume to the visible sub-volume and, in the zero-voltage state, are not wetted by the electrically conductive or polar liquids.

2. The display apparatus according to claim 1, wherein the display element comprises return flow conduits for returning at least part of the nonpolar liquid out of the visible sub-volume into that holding volume whose electrically conductive or polar liquid is intended to be moved into the visible sub-volume.

3. The display apparatus according to claim 1, wherein the nonpolar liquid is substantially transparent, and the light reflected at an underside of the visible sub-volume thus assumes the color of a reflector when the nonpolar liquid is present in the visible sub-volume, and the underside being specifically that side of the planar visible sub-volume at which the holding volumes are in fluidic communication with the visible sub-volume.

4. The display apparatus according to claim 1, wherein the display element is embodied in self-luminous fashion, having a light source that is arranged below the visible sub-volume in the viewing direction toward the display apparatus, and emits optical light that propagates at least partly through the visible sub-volume anti-parallel to the viewing direction.

5. The display apparatus according to claim 1, wherein the selection electrodes are through-plated through the respective holding volume to the back side of the display element, so that the display elements of the display apparatus are contactable over their entire back sides with the aid of standardized circuit boards.

6. The display apparatus according to claim 1, comprising exactly eight holding volumes, of which each holding volume receives one of the colors cyan, magenta, yellow, black, red, green, blue, and white.

7. The display apparatus according to claim 1, wherein the holding volumes are fluidically connected to the visible sub-volume in the region of a periphery of the latter, the visible sub-volume comprising a return flow conduit that extends along the periphery, having branches to the transition regions between the visible sub-volume and the holding volumes.

8. The display apparatus according to claim 1, wherein at least one holding volume is embodied as a planar cavity.

9. The display apparatus according to claim 8 wherein one dimension of the cavity corresponds substantially to one dimension of the visible sub-volume.

10. The display apparatus according to claim 8, wherein two dimensions of the cavity each correspond substantially to one dimension of the visible sub-volume, so that the electrically conductive or polar liquid associated with the cavity is transportable in substantially dimensionally stable fashion between the cavity and the visible sub-volume.

11. The display apparatus according to claim 8, wherein the cavity is aligned along an outer edge of the visible sub-volume.

12. The display apparatus according to claim 8, wherein the region in which the cavity opens into the visible sub-volume is aligned along an outer edge of the visible sub-volume.

* * * * *